United States Patent
Yi et al.

(10) Patent No.: US 9,788,226 B2
(45) Date of Patent: *Oct. 10, 2017

(54) METHOD AND APPARATUS FOR REPORTING CHANNEL STATE INFORMATION

(71) Applicant: LG ELECTRONICS INC., Seoul (KR)

(72) Inventors: Yunjung Yi, Anyang-si (KR); Joonkui Ahn, Anyang-si (KR); Bonghoe Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,935

(22) PCT Filed: Jun. 5, 2013

(86) PCT No.: PCT/KR2013/004980
§ 371 (c)(1),
(2) Date: Dec. 1, 2014

(87) PCT Pub. No.: WO2013/183946
PCT Pub. Date: Dec. 12, 2013

(65) Prior Publication Data
US 2015/0146558 A1    May 28, 2015

Related U.S. Application Data

(60) Provisional application No. 61/655,488, filed on Jun. 5, 2012, provisional application No. 61/715,313, filed
(Continued)

(51) Int. Cl.
*H04W 24/10* (2009.01)
*H04B 7/04* (2017.01)
(Continued)

(52) U.S. Cl.
CPC .......... *H04W 24/10* (2013.01); *H04B 7/0486* (2013.01); *H04B 7/0626* (2013.01);
(Continued)

(58) Field of Classification Search
None
See application file for complete search history.

(56) References Cited

U.S. PATENT DOCUMENTS

2004/0246961 A1*  12/2004  Dai .................. H04L 12/12
                                               370/392
2011/0019637 A1*  1/2011   Ojala ............... H04L 1/0026
                                               370/329
(Continued)

FOREIGN PATENT DOCUMENTS

KR    10-2009-0076784    7/2009
KR    10-2012-0001273    1/2012
(Continued)

OTHER PUBLICATIONS

PCT International Application No. PCT/KR2013/004980, Written Opinion of the International Searching Authority dated Sep. 4, 2013, 1 page.

*Primary Examiner* — Andrew Oh
(74) *Attorney, Agent, or Firm* — Lee Hong Degerman Kang & Waimey (57) ABSTRACT

Provided are a method and an apparatus for reporting channel state information in a wireless communication system. A wireless device determines a Channel status information (CSI) reference resource based on a CSI configuration, and estimates CSI from the CSI reference resource. The wireless device reports the estimated CSI to a base station.

4 Claims, 5 Drawing Sheets

Related U.S. Application Data on Oct. 18, 2012, provisional application No. 61/723,298, filed on Nov. 6, 2012, provisional application No. 61/723,747, filed on Nov. 7, 2012, provisional application No. 61/729,629, filed on Nov. 25, 2012, provisional application No. 61/750,815, filed on Jan. 10, 2013.

(51) Int. Cl.
   H04B 7/06 (2006.01)
   H04L 5/00 (2006.01)
   H04L 1/00 (2006.01)
   H04B 7/0417 (2017.01)

(52) U.S. Cl.
   CPC .......... H04L 1/0031 (2013.01); H04L 5/0057 (2013.01); H04B 7/0417 (2013.01); H04L 1/0026 (2013.01); H04L 5/0007 (2013.01)

(56) References Cited

U.S. PATENT DOCUMENTS

| | | | | |
|---|---|---|---|---|
| 2011/0235743 A1* | 9/2011 | Lee | H04L 5/0048 | 375/295 |
| 2011/0242969 A1* | 10/2011 | Dayal | H04W 36/0055 | 370/225 |
| 2011/0243106 A1* | 10/2011 | Hsu | H04L 5/0096 | 370/336 |
| 2012/0020230 A1 | 1/2012 | Chen et al. | | |
| 2012/0076028 A1* | 3/2012 | Ko | H04L 1/0026 | 370/252 |
| 2012/0120903 A1* | 5/2012 | Kim | H04B 7/024 | 370/329 |
| 2012/0270535 A1* | 10/2012 | Chen | H04W 24/10 | 455/422.1 |
| 2012/0287875 A1* | 11/2012 | Kim | H04B 7/024 | 370/329 |
| 2012/0314798 A1* | 12/2012 | Okvist | H04L 1/0023 | 375/295 |
| 2013/0114425 A1* | 5/2013 | Sayana | H04B 7/024 | 370/252 |
| 2013/0114430 A1* | 5/2013 | Koivisto | H04B 7/024 | 370/252 |
| 2013/0121312 A1* | 5/2013 | Roman | H04B 7/0486 | 370/335 |
| 2013/0201840 A1* | 8/2013 | Sorrentino | H04L 25/0204 | 370/252 |
| 2013/0229941 A1* | 9/2013 | Huang | H04B 7/0452 | 370/252 |
| 2013/0237235 A1* | 9/2013 | Nagata | H04W 24/10 | 455/450 |
| 2013/0258874 A1* | 10/2013 | Khoshnevis | H04L 5/0057 | 370/252 |
| 2013/0258992 A1* | 10/2013 | Seo | H04L 1/0026 | 370/329 |
| 2013/0294271 A1* | 11/2013 | Nagata | H04W 24/10 | 370/252 |
| 2013/0294351 A1* | 11/2013 | Kwon | H04W 24/10 | 370/328 |
| 2013/0301465 A1* | 11/2013 | Seo | H04B 7/0626 | 370/252 |
| 2013/0315092 A1* | 11/2013 | Yu | H04W 52/0216 | 370/252 |
| 2013/0329711 A1* | 12/2013 | Seo | H04J 11/0069 | 370/336 |
| 2014/0087720 A1* | 3/2014 | Takano | H04B 7/024 | 455/422.1 |
| 2014/0153426 A1* | 6/2014 | Kim | H04L 5/0023 | 370/252 |
| 2014/0177601 A1* | 6/2014 | Nishio | H04W 24/10 | 370/332 |
| 2014/0226509 A1* | 8/2014 | Ko | H04B 7/0626 | 370/252 |
| 2014/0226582 A1* | 8/2014 | Zeng | H04B 7/0626 | 370/329 |
| 2014/0321359 A1* | 10/2014 | Seo | H04L 5/0057 | 370/328 |
| 2014/0349664 A1* | 11/2014 | Pedersen | H04L 5/001 | 455/450 |
| 2015/0009898 A1* | 1/2015 | Rosa | H04L 5/0048 | 370/328 |
| 2015/0103704 A1* | 4/2015 | Skov | H04W 72/0446 | 370/280 |
| 2015/0131536 A1* | 5/2015 | Kaur | H04L 5/001 | 370/329 |
| 2015/0223265 A1* | 8/2015 | Fwu | H04W 52/04 | 370/329 |
| 2015/0249511 A1* | 9/2015 | Chen | H04L 1/0026 | 370/252 |

FOREIGN PATENT DOCUMENTS

| | | |
|---|---|---|
| KR | 10-2012-0029338 | 3/2012 |
| WO | 2011/130393 | 10/2011 |

* cited by examiner

METHOD AND APPARATUS FOR REPORTING CHANNEL STATE INFORMATION

CROSS-REFERENCE TO RELATED APPLICATIONS

This application is the National Stage filing under 35 U.S.C. 371 of International Application No. PCT/KR2013/004980, filed on Jun. 5, 2013, which claims the benefit of U.S. Provisional Application Ser. Nos. 61/655,488, filed on Jun. 5, 2012, 61/715,313, filed on Oct. 18, 2012, 61/723,298, filed on Nov. 6, 2012, 61/723,747, filed on Nov. 7, 2012, 61/729,629, filed on Nov. 25, 2012 and 61/750,815, filed on Jan. 10, 2013, the contents of which are all hereby incorporated by reference herein in their entirety.

BACKGROUND OF THE INVENTION

Field of the Invention

The present invention relates to wireless communication and, more particularly, to a method and apparatus for reporting channel state information in a wireless communication system.

Related Art

3rd generation partnership project (3GPP) Long Term Evolution (LTE), that is, an improvement of a Universal Mobile Telecommunication System (UMTS), is introduced as the 3GPP release 8. The 3GPP LTE uses Orthogonal Frequency Division Multiple Access (OFDMA) in downlink, and uses Single Carrier-Frequency Division Multiple Access (SC-FDMA) in uplink. The 3GPP LTE employs Multiple Input Multiple Output (MIMO) having up to four antennas. In recent years, there is an ongoing discussion on 3GPP LTE-Advanced (LTE-A) that is an evolution of the 3GPP LTE.

As disclosed in 3GPP TS 36.211 V8.7.0 (2009-05) "Evolved Universal Terrestrial Radio Access (E-UTRA); Physical Channels and Modulation (Release 8)," in 3GPP LTE/LTE-A, physical channels may be divided into a physical downlink shared channel (PDSCH) and a physical downlink control channel (PDCCH), that is, downlink channels, and a physical uplink shared channel (PUSCH) and a physical uplink control channel (PUCCH), that is, uplink channels.

Conventional 3GPP LTE provides a Cell-specific Reference Signal (CRS) used to estimate channel state information. However, the CRS is transmitted in all the subframes over the entire system band. Accordingly, a scheme for not sending the CRS or sending the CRS in limited resources is being discussed in order to reduce overhead attributable to the transmission of the CRS in all the subframes over the entire system band.

SUMMARY OF THE INVENTION

The present invention provides a method and apparatus for reporting channel state information in a wireless communication system.

In an aspect, a method for reporting Channel State Information (CSI) in a wireless communication system is provided. The method includes receiving, by a wireless device, information about a CSI configuration from a base station, determining, by the wireless device, a CSI reference resource based on the CSI configuration, estimating, by the wireless device, CSI based on the CSI reference resource, and reporting, by the wireless device, the estimated CSI to the base station.

The CRS configuration may include a CSI flag that indicates whether a Rank Indicator (RI) and a Precoding Matrix Indicator (PMI) are included in the CSI.

The CSI may be estimated assuming that the RI and the PMI are included in the CSI irrespective of a value of the CSI flag.

In another aspect, a wireless device for reporting Channel State Information (CSI) in a wireless communication system is provided. The wireless device includes a radio frequency (RF) unit configured to transmit and receive a radio signal, and a processor connected to the RF unit and configured to receive information about a CSI configuration from a base station, determine a CSI reference resource based on the CSI configuration, estimate CSI based on the CSI reference resource, and report the estimated CSI to the base station.

A wireless device can estimate channel state information without a CRS.

DESCRIPTION OF EXEMPLARY EMBODIMENTS

A wireless device may be fixed or may have mobility. The wireless device may be called another term, such as User Equipment (UE), a Mobile Station (MS), a User Terminal (UT), a Subscriber Station (SS), or a Mobile Terminal (MT). In general, a Base station (BS) refers to a fixed station that communicates with wireless devices and may be called another term, such as an evolved-NodeB (eNB), a Base Transceiver System (BTS), or an access point.

Hereinafter, an example in which the present invention is applied based on 3$^{rd}$ Generation Partnership Project (3GPP) Long Term Evolution (LTE) or 3GPP LTE-Advanced (A) is described. This is only an example, and the present invention may be applied to various wireless communication systems. Hereinafter, LTE includes LTE and/or LTE-A.

A wireless device can be served by a plurality of serving cells. Each serving cell can be defined as a downlink (DL) component carrier (CC) or a pair of a DL CC and an uplink (UL) CC.

A serving cell can be classified as a primary cell and a secondary cell. The primary cell is operated on a primary frequency and can be a cell that performs an initial connection establishment procedure, performs a connection reestablishment procedure or is initially designated as a primary cell during a handover. The primary cell can also referred to as a reference cell. The secondary cell can be operated on a secondary frequency and can be configured after a radio resource control (RRC) connection has been completed. The secondary cell can be used to provide additional radio resources. At least one primary cell is configured ti the wireless device. The secondary cell can be added/modified/released by a higher layer signal (i.e. RRC message) of the primary cell.

A cell index (CI) of the primary cell can be fixed. For example, the primary cell can have the lowest CI. Hereinafter, it is assumed that the CI of the primary cell is 0 and the CI of the secondary cell is subsequently assigned starting from 1.

Figure 1:
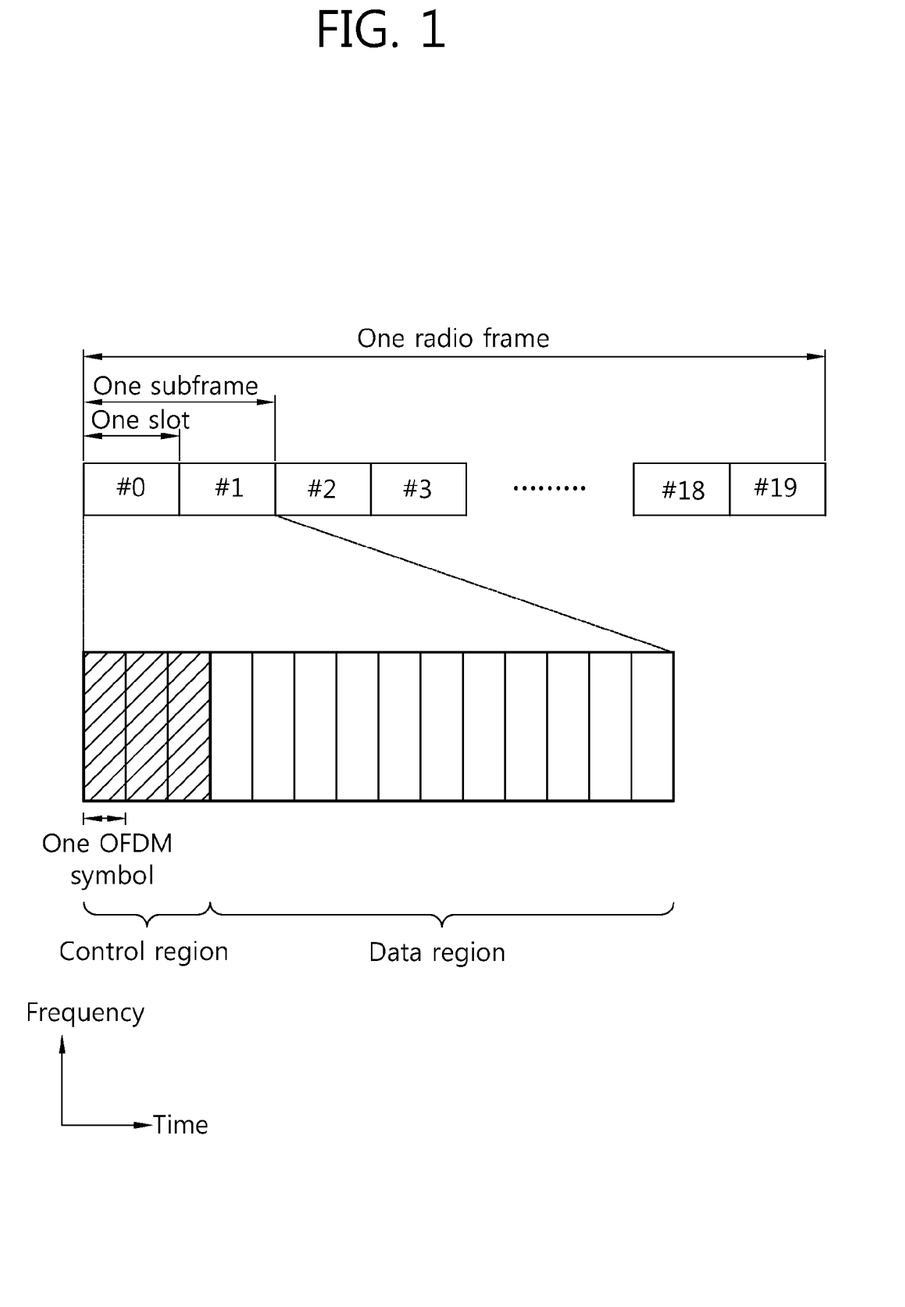
FIG. 1 illustrates the configuration of a downlink radio frame in 3GPP LTE.

FIG. 1 illustrates the configuration of a downlink radio frame in 3GPP LTE. For the configuration of the downlink radio frame, reference may be made to section 4 of 3GPP TS 36.211 V10.4.0 (2011-12) "Evolved Universal Terrestrial Radio Access (E-UTRA); Physical Channels and Modulation (Release 10)".

A radio frame includes 10 subframes to which indices 0~9 are assigned. A single subframe includes two contiguous slots. The time taken to send a single subframe is called a Transmission Time Interval (TTI). For example, the length of a single subframe may be 1 ms, and the length of a single slot may be 0.5 ms.

A single slot may include a plurality of Orthogonal Frequency Division Multiplexing (OFDM) symbols in a time domain. The OFDM symbol is only for representing a single symbol period in the time domain because 3GPP LTE uses Orthogonal Frequency Division Multiple Access (OFDMA) in downlink (DL), and there is no limit to a multiple access method or name. For example, the OFDM symbol may be called another term, such as a Single Carrier-Frequency Division Multiple Access (SC-FDMA) symbol or a symbol period.

A single slot is illustrated as including 7 OFDM symbols, but the number of OFDM symbols included in a single slot may be changed depending on the length of a Cyclic Prefix (CP). In accordance with 3GPP TS 36.211 V10.4.0, a single slot includes 7 OFDM symbols in a normal CP, and a single slot includes 6 OFDM symbols in an extended CP.

A Resource Block (RB) is a resource allocation unit and includes a plurality of subcarriers in a single slot. For example, if a single slot includes 7 OFDM symbols in the time domain and a resource block includes 12 subcarriers in the frequency domain, a single resource block may include 7×12 Resource Elements (REs).

A DL subframe is divided into a control region and a data region in the time domain. The control region includes a maximum of former 3 OFDM symbols of a first slot within the subframe, but the number of OFDM symbols included in the control region may be changed. Physical downlink control channels (PDCCHs) and other control channels are allocated to the control region, and PDSCHs are allocated to the data region.

As disclosed in 3GPP TS 36.211 V10.4.0, 3GPP LTE, physical channels may be divided into a physical downlink shared channel (PDSCH) and a physical uplink shared channel (PUSCH), that is, data channels, and a physical downlink control channel (PDCCH), a physical control format indicator channel (PCFICH), a physical hybrid-ARQ indicator channel (PHICH), and a physical uplink control channel (PUCCH), that is, control channels.

A PCFICH transmitted in the first OFDM symbol of a subframe carries a Control Format Indicator (CFI) regarding the number of OFDM symbol (i.e., the size of a control region) used to send control channels within the subframe. UE first receives a CFI on a PCFICH and monitors a PDCCH.

Unlike a PDCCH, a PCFICH is transmitted through fixed PCFICH resources of a subframe without using blind decoding.

A PHICH carries positive-acknowledgement (ACK)/negative-acknowledgement (NACK) signals for an uplink Hybrid Automatic Repeat reQuest (HARQ). ACK/NACK signals for uplink (UL) data on a PUSCH transmitted by UE is transmitted on a PHICH.

A physical broadcast channel (PBCH) is transmitted in the former 4 OFDM symbols of a second slot within the first subframe of the radio frame. The PBCH carries system information that is essential for UE to communicate with a BS. System information transmitted through the PBCH is called a Master Information Block (MIB). In contrast, system information transmitted on a PDSCH indicated by a PDCCH is called a System Information Block (SIB).

Control information transmitted through a PDCCH is called Downlink Control Information (DCI). The DCI may include the resource allocation of a PDSCH (this is also called a downlink (DL) grant), the resource allocation of a PUSCH (this is also called an uplink (UL) grant), a set of transmit power control commands for pieces of UE within a specific UE group and/or the activation of a Voice over Internet Protocol (VoIP).

In 3GPP LTE, blind decoding is used to detect a PDCCH. Blind decoding is a method of checking whether or not a corresponding PDCCH is its own control channel by demasking a desired identifier to the Cyclic Redundancy Check (CRC) of the received PDCCH (this is called a candidate PDCCH) and checking an CRC error.

A BS determines a PDCCH format based on DCI to be transmitted to UE, attaches CRC to the DCI, and masks a unique identifier (this is also called a Radio Network Temporary Identifier (RNTI)) to the CRC depending on the owner or use of a PDCCH.

In accordance with 3GPP TS 36.211 V8.7.0, an uplink channel includes a PUSCH, a PUCCH, a Sounding Reference Signal (SRS), and a Physical Random Access Channel (PRACH).

Uplink Control Information (UCI) includes at least one of HARQ ACK/NACK, Channel State Information (CSI) and a Scheduling Request (SR). The CSI can represent a state of DL channels and can includes at least one of a Channel Quality Indicator (CQI)m a Rank Indicator (RI) and a Precoding Matrix Indicator (PMI).

To send various USCI on a PUCCH, PUCCH formats can be defined as a combination of UCI and PUCCH as follows.

TABLE 1

| PUCCH format | UCI to be sent |
| --- | --- |
| PUCCH format 1 | a positive SR |
| PUCCH format 1a/1b | 1 bit or 2 bits HARQ ACK/NACK |
| PUCCH format 2 | a CSI report |
| PUCCH format 2a/2ba | CSI report and 1 bit or 2 bits HARQ ACK/NACK |
| PUCCH format 3 | HARQ ACK/NACK, SR, CSI |

A PUCCH format 3 can carry 48 bits encoded UCI. A PUCCH format 3 can carry HARQ ACK/NACK for a plurality of serving cells and CSI for a serving cell.

Figure 2:
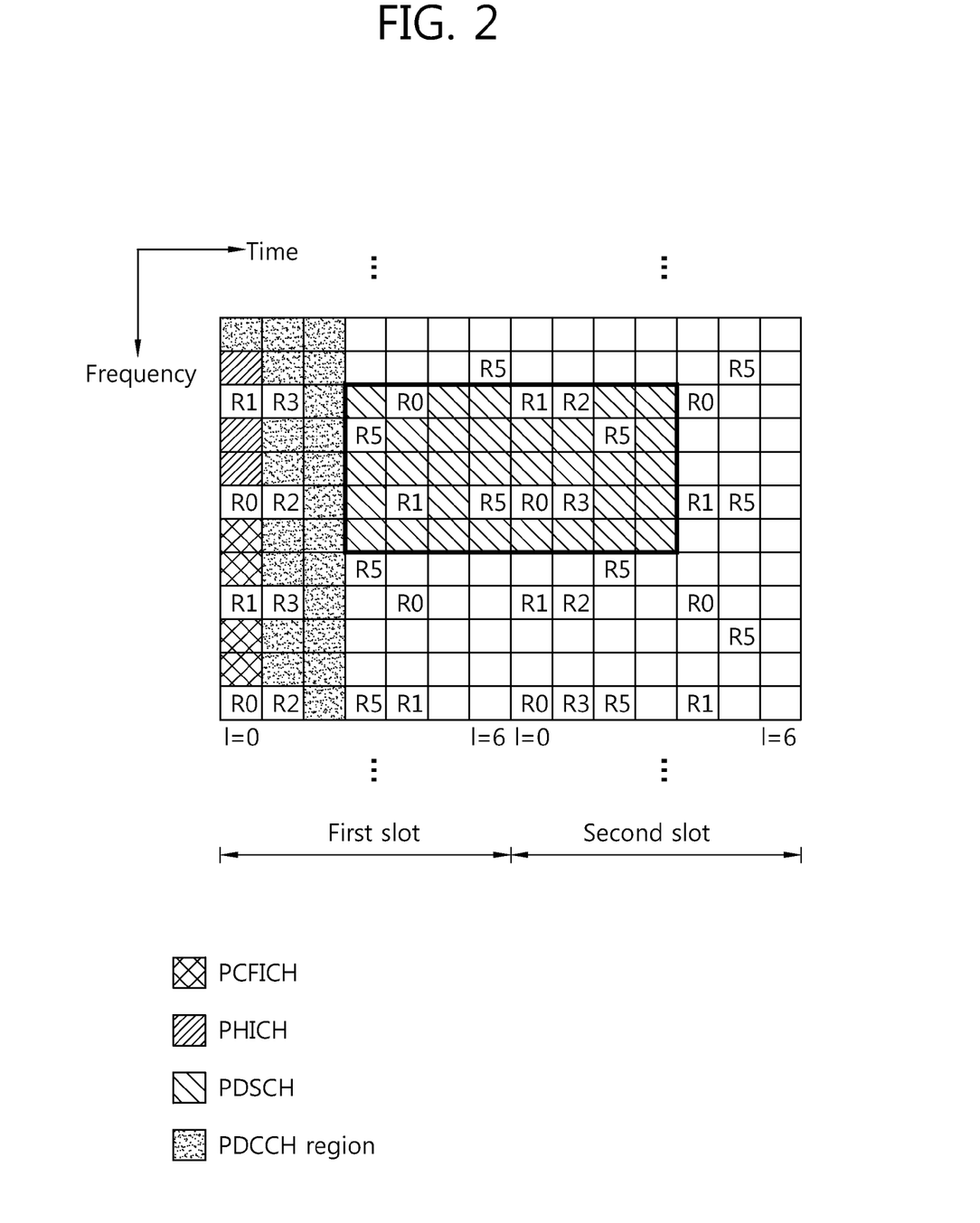
FIG. 2 illustrates an example in which reference signals and control channels are disposed in a DL subframe of 3GPP LTE.

FIG. 2 illustrates an example in which reference signals and control channels are disposed in a DL subframe of 3GPP LTE.

A control region (or a PDCCH region) includes former 3 OFDM symbols, and a data region in which PDSCHs are transmitted includes the remaining OFDM symbols.

A PCFICH, a PHICH and/or a PDCCH are transmitted in the control region. The CFI of the PCFICH denotes the 3 OFDM symbols. A region that is included in the control region and from which resources in which a PCFICH and/or a PHICH are transmitted are excluded is a PDCCH region in which a PDCCH is monitored.

Furthermore, various reference signals are transmitted in the subframe.

A Cell-specific Reference Signal (CRS) may be received by all the wireless devices within a cell and is transmitted over the entire downlink band. In the drawing, 'R0' is indicative of a Resource Element (RE) in which the CRS of a first antenna port is transmitted, 'R1' is indicative of an RE in which the CRS of a second antenna port is transmitted, 'R2' is indicative of an RE in which the CRS of a third antenna port is transmitted, and 'R3' is indicative of an RE in which the CRS of a fourth antenna port is transmitted.

An RS sequence $r_{l,ns}(m)$ for the CRS is defined as in the following equation.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

In Equation 1, m=0, 1, . . . , $2N_{maxRB}$−1, $N_{maxRB}$ are a maximum number of RBs, ns is a slot number within a radio frame, and l is an OFDM symbol number within the slot.

A pseudo-random sequence c(i) is defined by a gold sequence having a length of 31.

$c(n)=(x_1(n+Nc)+x_2(n+Nc)) \bmod 2$ $x_1(n+31)=(x_1(n+3)+x_1(n)) \bmod 2$ $x_2(n+31)=(x_2(n+3)+x_2(n+2)+x_2(n+1)+x_2(n)) \bmod 2$ [Equation 2]

In Equation 2, Nc=1600, and a first m-sequence is initialized to $x_1(0)=1$, $x_1(n)=0$, m=1, 2, . . . , 30.

A second m-sequence is initialized to $c_{init}=2^{10}(7(ns+1)+l+1)(2N^{cell}_{ID}+1)+2N^{cell}_{ID}+N_{CP}$ at the start of each OFDM symbol. $N^{cell}_{ID}$ is the Physical Cell Identity (PCI) of a cell, and is $N_{CP}=1$ in a normal CP and $N_{CP}=0$ in an extended CP.

A UE-specific Reference Signal (URS) is transmitted in the subframe. A CRS is transmitted in the entire region of the subframe, whereas the URS is transmitted within the data region of the subframe and used to demodulate a corresponding PDSCH. In the drawing, 'R5' is indicative of an RE in which the URS is transmitted. The URS is also called a Dedicated Reference Signal (DRS) or a demodulation Reference Signal (DM-RS).

A URS is transmitted only in an RB to which a corresponding PDSCH is mapped. In the drawing, R5 is indicated in regions other than a region in which a PDSCH is transmitted, but this is for indicating the location of an RE to which a URS is mapped.

The URS is used by only a wireless device that receives a corresponding PDSCH. The RS sequence $r_{ns}(m)$ for the URS is the same as Equation 1. In this case, m=0, 1, . . . , $12N_{PDSCH,RB}$−1, and $N_{PDSCH,RB}$ is the number of RBs for the transmission of a corresponding PDSCH. A pseudo random sequence generator is initialized to $c_{init}=(floor(ns/2)+1)(2N^{cell}_{ID}+1)2^{16}+n_{RNTI}$ at the start of each subframe. $n_{RNTI}$ is the ID of a wireless device.

The above corresponds to a case where the URS is transmitted in a single antenna. When the URS is transmitted through multiple antennas, a pseudo random sequence generator is initialized to $c_{init}=(floor(ns/2)+1)(2N^{cell}_{ID}+1)2^{16}+n_{SCID}$ at the start of each subframe. $n_{SCID}$ is a parameter obtained from a DL grant (e.g., the DCI format 2B or 2C) related to the transmission of a PDSCH.

Figure 3:
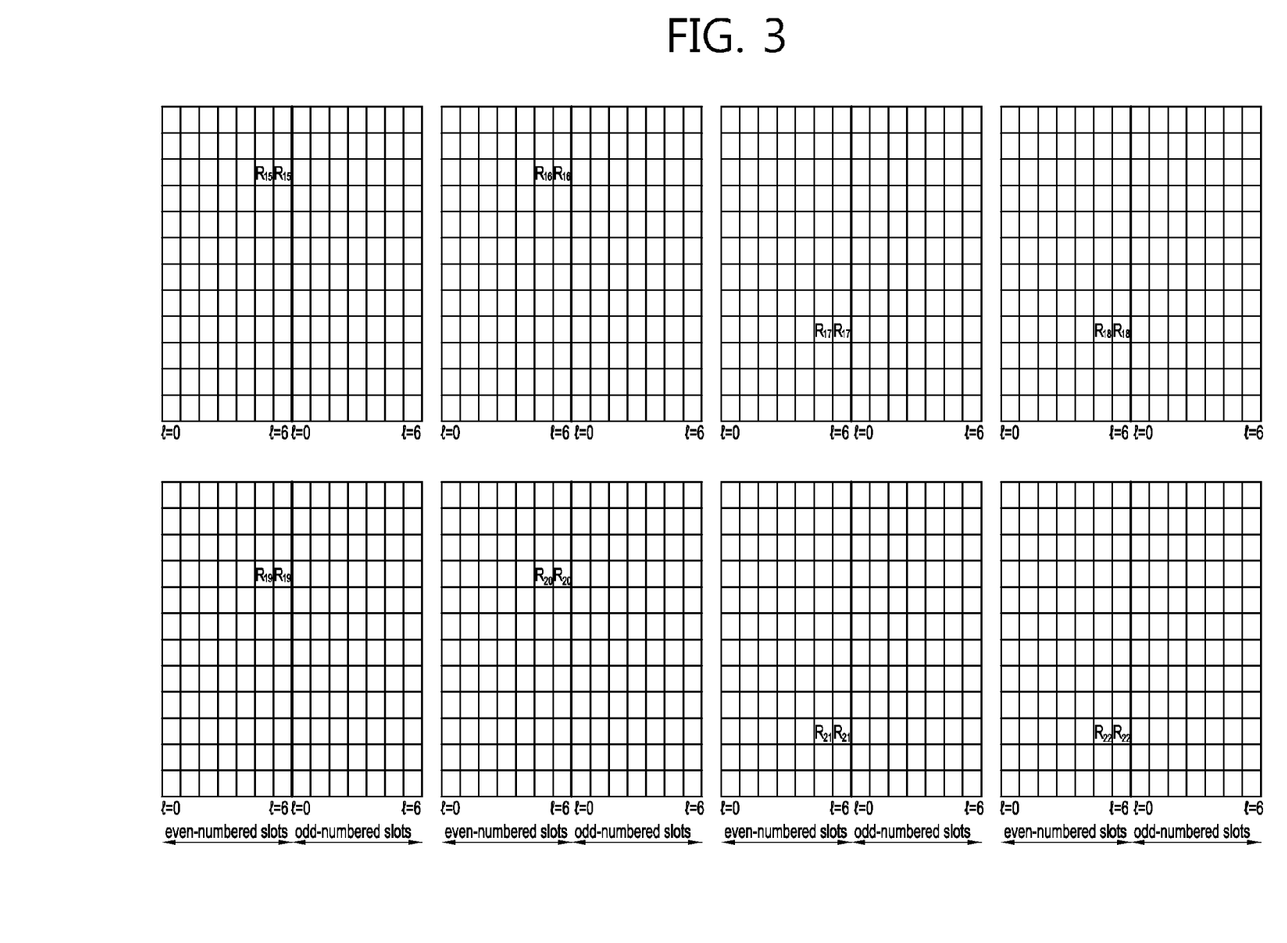
FIG. 3 illustrates an example of CSI-RS mapping.

FIG. 3 illustrates an example of CSI-RS mapping.

In order to estimate a channel state, a Channel State Information-Reference Signal (CSI-RS) is defined separately from a CRS. Unlike the CRS, the CSI-RS includes a maximum of 32 different configurations in order to reduce inter-cell interference in a multi-cell environment.

A CSI-RS has a different configuration depending on the number of antenna ports within a cell. A different configuration is given between neighboring cells to the maximum. A CSI-RS is divided depending on its CP type. A CSI-RS is divided into a configuration applied to both a frame structure type 1 and a frame structure type 2 and a configuration applied to only the frame structure type 2 depending on its frame structure type (the frame structure type 1 is FDD and the frame structure type 2 is TDD).

A CSI-RS supports up to a maximum of 8 antenna ports. {15}, {15, 16}, {15,16,17,18}, {15, . . . , 22} are supported for an antenna port p. That is, the antenna port p supports 1, 2, 4, or 8 antenna ports.

An RS sequence $r_{ns}(m)$ for a CSI-RS is the same as Equation 1. In this case, a pseudo random number sequence generator is reset to $c_{init}=2^{10}(7(ns+1)+l+1)(2N^{csi}_{ID}+1)+2N^{csi}_{ID}+N_{CP}$ at the start of each OFDM symbol. $N^{csi}_{ID}$ is the same as $N^{cell}_{ID}$ if is not separately configured. $N_{CP}=1$ in a normal CP, and $N_{CP}=0$ in an extended CP.

In subframes configured to send a CSI-RS, the RS sequence $r_{ns}(m)$ is mapped to a complex modulation symbol $a_{k,l}(P)$, used as the reference symbol of the antenna port p, as in the following equation.

$$a^{(p)}_{k,l} = w_{l''} \cdot r_{l,n_s}(m') \quad \text{[Equation 3]}$$

where $$k = k' + 12m + \begin{cases} -0 & \text{for } p \in \{15, 16\}, \text{normal } CP \\ -6 & \text{for } p \in \{17, 18\}, \text{normal } CP \\ -1 & \text{for } p \in \{19, 20\}, \text{normal } CP \\ -7 & \text{for } p \in \{21, 22\}, \text{normal } CP \\ -0 & \text{for } p \in \{15, 16\}, \text{extended } CP \\ -3 & \text{for } p \in \{17, 18\}, \text{extended } CP \\ -6 & \text{for } p \in \{19, 20\}, \text{extended } CP \\ -9 & \text{for } p \in \{21, 22\}, \text{extended } CP \end{cases}$$

$$l = l' + \begin{cases} l'' & CSI\text{-}RS \text{ configurations } 0\text{-}19, \text{normal } CP \\ 2l'' & CSI\text{-}RS \text{ configurations } 20\text{-}31, \text{normal } CP \\ l'' & CSI\text{-}RS \text{ configurations } 0\text{-}27, \text{extended } CP \end{cases}$$

$$w_{l''} = \begin{cases} 1 & p \in \{15, 17, 19, 21\} \\ (-1)^{l''} & p \in \{16, 18, 20, 22\} \end{cases}$$

$l'' = 0, 1$ $m = 0, 1, \ldots, N^{DL}_{RB} - 1$ $$m' = m + \left\lfloor \frac{N^{max,DL}_{RB} - N^{DL}_{RB}}{2} \right\rfloor$$

In Equation 3, (k', l') and ns may be given as in Table 2. The CSI-RS may be transmitted in a downlink slot in which (ns mod 2) satisfies the conditions of Table 2.

The following table illustrates an example of the CSI-RS configurations of a normal CP.

TABLE 2

| CSI-RS configuration | Number of CSI-RS configured | | | | | |
|---|---|---|---|---|---|---|
| | 1 or 2 | | 4 | | 8 | |
| | (k', l') | ns mod 2 | (k', l') | ns mod 2 | (k', l') | ns mod 2 |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |
| 17 | (0, 2) | 1 | | | | |
| 18 | (3, 5) | 1 | | | | |
| 19 | (2, 5) | 1 | | | | |

A subframe including a CSI-RS satisfies the following equation.

$$10n_f + \lfloor n_s/2 \rfloor - \Delta_{CSI-RS} \mod T_{CSI-RS} = 0 \quad \text{[Equation 4]}$$

In Equation 4, nf of is a system frame number, and $\Delta_{CSI-RS}$ and $T_{CSI-RS}$ are given as follows depending on the configuration of a CSI-RS subframe.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

The 'CSI-RS-SubframeConfig' $I_{CSI-RS}$ is a value given by a higher layer and is indicative of a CSI-RS subframe configuration. $T_{CSI-RS}$ denotes a cell-specific subframe configuration cycle, and $\Delta_{CSI-RS}$ denotes a cell-specific subframe offset. A CSI-RS supports 5 duty cycles according to CSI feedback, and it may be transmitted with a different subframe offset in each cell.

In the example of FIG. 3, a CSI-RS is transmitted using two same consecutive resource elements with respect to 2 antenna ports, for example, p={15, 16}, {17, 18}, {19, 20}, {21, 22}, but is transmitted using Orthogonal Cover Code (OCC). Each CSI-RS is allocated with a specific pattern in a radio resource region depending on a CSI-RS configuration. In this sense, a radio resource configuration for a CSI-RS in corresponding antenna ports is also called a CSI-RS pattern.

A resource element (k,l) used to send a CSI-RS for a set S of specific antenna ports is not used to send specific antenna ports in the same slot. Furthermore, the resource element (k,l) is not used to send a CSI-RS for different specific antenna ports other than the set S in the same slot. In this case, the antenna ports included in the set S are {15, 16}, {17,18}, {19,20}, {21, 22}.

A CSI report in 3GPP LTE is described with reference to Paragraph 7.2 of 3GPP TS 36.213 V10.4.0 (2011-12) "Evolved Universal Terrestrial Radio Access (E-UTRA); Physical layer procedures (Release 10)".

The CSI report is divided into aperiodic CSI and periodic CSI. In the aperiodic CSI, a wireless device reports CSI in response to a request from a BS. In the periodic CSI, a wireless device reports CSI in a cycle predetermined by a BS.

As a wireless device supports various transmission modes, such as single antenna transmission and multiple antenna transmission, various CSI reporting modes are supported. The following table is an example of reporting modes for a periodic CSI report.

TABLE 4

| | PMI Feedback Type | |
|---|---|---|
| | No PMI | Single PMI |
| Wideband CQI | Mode 1-0 | Mode 1-1 |
| Subband CQI | Mode 2-0 | Mode 2-1 |

One or more reporting modes may be configured in a wireless device.

Reporting types, such as those of the following table, are also defined along with the reporting modes.

TABLE 5

| Reporting Type | Contents |
|---|---|
| Type 1 | Subband CQI |
| Type 1a | Subband CQI and second PMI |
| Type 2/2b/2c | Wideband CQI and PMI |
| Type 2a | Wideband PMI |
| Type 3 | RI |
| Type 4 | Wideband CQI |
| Type 5 | RI and wideband PMI |
| Type 6 | RI and PTI |

In a reporting mode, what CSI will be reported is configured. Information included in CSI is determined depending on a reporting type in a specific reporting mode. That is, CSI may include at least any one of the followings.

A Rank Indicator (RI)

A Subband CQI: the CQI of any one of S (S>1) subbands. The size of a subband may be different depending on the size of a system band.

A wideband CQI: the CQI of an S subband

A Wideband PMI: the PMI of an S subband

A Precoding Type Indicator (PTI): the type of a PMI

The size of payload of information within each reporting type is different depending on a reporting mode and a mode state.

When transmission mode 8, transmission mode 9, or transmission mode 10 is configured, a BS may indicate whether a PMI and an RI are included in CSI using a CSI flag transmitted through an RRC message. If a CSI flag is "on", CSI including a PMI and an RI are reported. If a CSI flag is "off", CSI not including a PMI and an RI are reported.

Transmission mode 8, transmission mode 9, or transmission mode 10 is a transmission mode in which the number of layers is 4 or more and which supports multiple antenna transmission or CoMP transmission.

CSI reference resources (CSI reference signal) mean radio resources (PRB and/or OFDM symbol) related to the value of an obtained CQI.

PDSCH transmission methods according to transmission modes are listed in the following table.

TABLE 6

| Transmission mode | PDSCH transmission methods |
|---|---|
| 1 | Single-antenna port, port 0 |
| 2 | Transmit diversity |
| 3 | Transmit diversity if the associated rank indicator is 1, otherwise large delay CDD |
| 4 | Closed-loop spatial multiplexing |
| 5 | Multi-user MIMO |
| 6 | Closed-loop spatial multiplexing with a single transmission layer |
| 7 | If the number of PBCH antenna ports is one, Single-antenna port, port 0; otherwise Transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing |
| 9 | If the UE is configured without PMI/RI reporting: if the number of PBCH antenna ports is one, single-antenna port, ort 0; otherwise transmit diversity. If the UE is configured without PMI/RI reporting: if the number of PBCH antenna ports is one, single-antenna port, port 0; otherwise transmit diversity. |
| 10 | If a CSI process of the UE is configured without PMI/RI reporting: if the number of CSI-RS ports is one, single-antenna port, port7; otherwise transmit diversity. If a CSI process of the UE is configured with PMI/RI reporting: if the number of CSI-RS ports is one, single-antenna port, port 7; otherwise up to 8 layer transmission, ports 7-14. |

As described above, an existing wireless communication system based on 3GPP LTE/LTE-A sends a reference signal, a sync signal, a control channel, etc. through DL carriers. A DL carrier based on 3GPP LTE/LTE-A is called a legacy carrier.

In the next-generation wireless communication system, however, a new carrier is introduced in order to reduce interference between a plurality of serving cells and to improve the extensibility of a carrier. The new carrier is called an extension carrier or a New Carrier Type (NCT). A cell based on such an extension carrier is called an extension cell.

In a legacy carrier, a CRS is transmitted in all the DL subframes over the entire system band. In contrast, in an NCT, a CRS is not transmitted or is transmitted in specific DL subframes over some of a system band.

In a legacy carrier, a PDCCH is demodulated based on a CRS. In an NCT, however, a PDCCH may not be transmitted. In a legacy carrier, a CRS is used for data demodulation. In an NCT, however, only a URS (and/or a UE-specific RS) is used for data demodulation.

A legacy carrier may be configured as a primary cell or secondary cell, but an extension cell may be configured as only a secondary cell.

In particular, since a CRS is not transmitted or is limitedly transmitted in an NCT, a tracking RS (hereinafter referred to as a 'TRS') for frequency/time synchronization tracking based on a CRS may be configured in a wireless device.

CSI measurement based on a CRS may be ambiguous because the CRS is not transmitted in an NCT as described above. In particular, in transmission modes 8/9/10, whether PMI/RI reporting is present or not is also configured. A problem is that how CSI reference resources will be determined.

Figure 4:
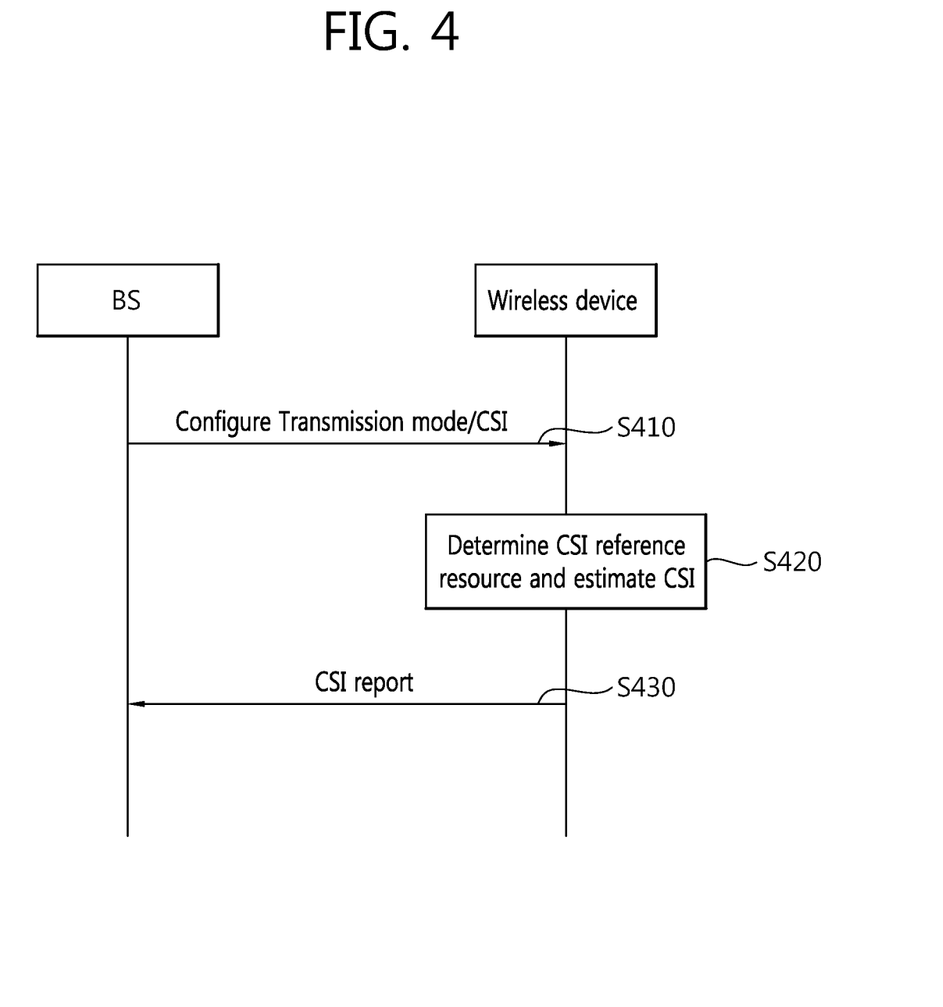
FIG. 4 is a flowchart illustrating a method of reporting CSI in accordance with an embodiment of the present invention.

FIG. 4 is a flowchart illustrating a method of reporting CSI in accordance with an embodiment of the present invention.

At step S410, a BS sends information about a transmission mode configuration and/or a CSI configuration to a wireless device.

Transmission mode may be configured to be a mode that supports multiple antenna transmission or CoMP transmission. For example, transmission mode may be configured to be transmission mode 8, transmission mode 9, or transmission mode 10.

The CSI configuration may include a configuration regarding periodic reporting or aperiodic reporting. The CSI configuration may include a CSI flag indicative of whether a PMI and an RI are included in the CSI.

At step S420, the wireless device determines CSI reference resources and estimates CSI based on the CSI reference resources.

At step S430, the wireless device reports the CSI to the BS. The CSI may be transmitted on a PUCCH or PUSCH.

Embodiments in which an RS used for CSI measurement and CSI reference resources are determined are described below.

In a first embodiment, a TRS may be used to measure CSI. CSI may be measured based on a TRS because a CRS is not transmitted in an NCT. If a CSI flag is 'off', a wireless device assumes single antenna transmission and may estimate a channel based on a TRS associated with a corresponding antenna port (e.g., the antenna port 0 or the antenna port 7). If the number of antenna ports of a CSI-RS is 2, a PDSCH transmission method may be assumed to be transmission diversity. CSI reference resources may be valid in a subframe in which a TRS is transmitted because the TRS is periodic (e.g., a 5 ms cycle).

In a second embodiment, although a CSI flag is set to 'off', a wireless device may neglect the CSI flag, may assume that the CSI flag has been set to 'on', and may perform a CSI report. That is, a case where a CSI flag is 'off' is not used.

A wireless device may assume that a single CSI-RS antenna port (e.g., the antenna port 15) has been configured. In periodic reporting, a wireless device may not report a PMI or RI because the number of CSI-RS antenna ports is 1. In aperiodic reporting, a wireless device may consider that a PMI is not reported and may perform a CSI report as if a CSI flag has not been set.

In a third embodiment, CSI may be estimated assuming that a TRS is the CRS of the antenna port 0. In order to obtain better estimation, a BS may send the CRS of the antenna port 1. CSI reference resources may be valid in a subframe in which a TRS is transmitted because the TRS is periodic (e.g., a 5 ms cycle).

In a fourth embodiment, a CSI-RS may be used for CSI measurement. A wireless device uses a CSI-RS for CSI estimation instead of a CRS. A wireless device may assume that only a single CSI-RS antenna port (e.g., the antenna port 15) has been configured. In periodic reporting, a wireless device may not report a PMI or RI because the number of CSI-RS antenna ports is 1. In aperiodic reporting, a wireless device may consider that a PMI is not reported.

In a fifth embodiment, in transmission mode 9 or transmission mode 10, CSI reference resources may be determined assuming that an RE used in a CRS or TRS is not present. It may be assumed that an RE used in a CRS or TRS is not present within one or more PRBs defined as CSI reference resources. Accordingly, assuming that REs for a PDSCH or EPDCCH are increased, CSI may be estimated.

If a TRS is used for CSI estimation, a PDSCH transmission method may be configured as follows.

TABLE 7

If the UE is configured without PMI/RI reporting:
take one assumption among the following choices:
(1) antenna ports is one, single-antenna port, port 7
(2) antenna port is same as the antenna port of TRS
(3) antenna port is one, single-antenna port, port 0
Otherwise, transmit diversity
Closed-loop spatial multiplexing with up to 8 layer transmission, ports 7-14.

If a CSI-RS is used for CSI estimation, a PDSCH transmission method may be configured as follows.

TABLE 8

If the UE is configured without PMI/RI reporting:
take one assumption among the following choices:
(1) if rank = 1, antenna port is one, single antenna port 7
(2) if rank > 1, same as PMI/RI reporting is configured (when option 2 is used)
(3) if rank > 1, antenna port is one, single antenna port 7 (when option 4 is used)
Closed-loop spatial multiplexing with up to 8 layer transmission, ports 7-14

In order to estimate CSI, a wireless device may make an assumption as follows. Unlike in a legacy carrier, a control region for a PDCCH may not be defined in an NCT, or a CRS may not be defined in an NCT. Accordingly, it may be assumed that an RE for a PDCCH or CRS is not assigned.

Unlike in a legacy carrier, REs used to send a PDCCH may be included in CSI reference resources because a PDCCH transmitted in the first 3 OFDM symbols of a subframe is not transmitted in an NCT. Alternatively, CSI reference resources are configured based on a parameter indicative of a PDSCH start OFDM symbol configured by a higher layer.

For time/frequency tracking, an RE allocated to an RS transmitted in a specific subframe is assumed to be not present.

It is assumed that an RE allocated to a PDCCH and an EPDCCH, that is, a different control channel, is not present.

If CSI is estimated using an RS transmitted for time/frequency tracking, a wireless device may receive information about a power offset to be applied when the transmission power of an RS transmitted for time/frequency tracking and CSI are estimated from a BS and may then estimate CSI. Information about the transmission power of a PDSCH may be given in the form of a ratio of the power of an RS, transmitted for time/frequency tracking, to the power of the PDSCH or may be given in the form of a ratio of the Energy Per Resource Element (EPRE) of an RS, transmitted for time/frequency tracking, to the EPRE of each PDSCH RE.

In a PDSCH transmission method assumed for CSI reference resources, CSI is estimated based on a transmission method of performing demodulation using an RS using a CSI-RS. However, the amount of CSI feedback can be reduced using channel reciprocity because the same frequency is used in downlink and uplink in the case of TDD. In order to support a CSI feedback method capable of using channel reciprocity, whether a PMI/RI will be fed back is configured using a CSI flag. If a PMI and an RI are transmitted, a PDSCH transmission method for CSI reference resources may assume transmission mode 9 capable of up to 8 layer transmission.

If a PMI and an RI are not transmitted, a PDSCH transmission method for CSI reference resources may assume the transmission of a PDSCH using a single antenna port. In this case, the same antenna port as an antenna port in which a reference signal used for time/frequency tracking is transmitted is used as the antenna port of the PDSCH. In an alternative method, the transmission of a PDSCH using a single antenna port is assumed. In such a case, assuming a specific antenna port (e.g., the antenna port 7) of a URS, the value of a CQI having an average value to which all the PMIs defined for feedback have been applied may be transmitted as a CSI feedback value.

Figure 5:
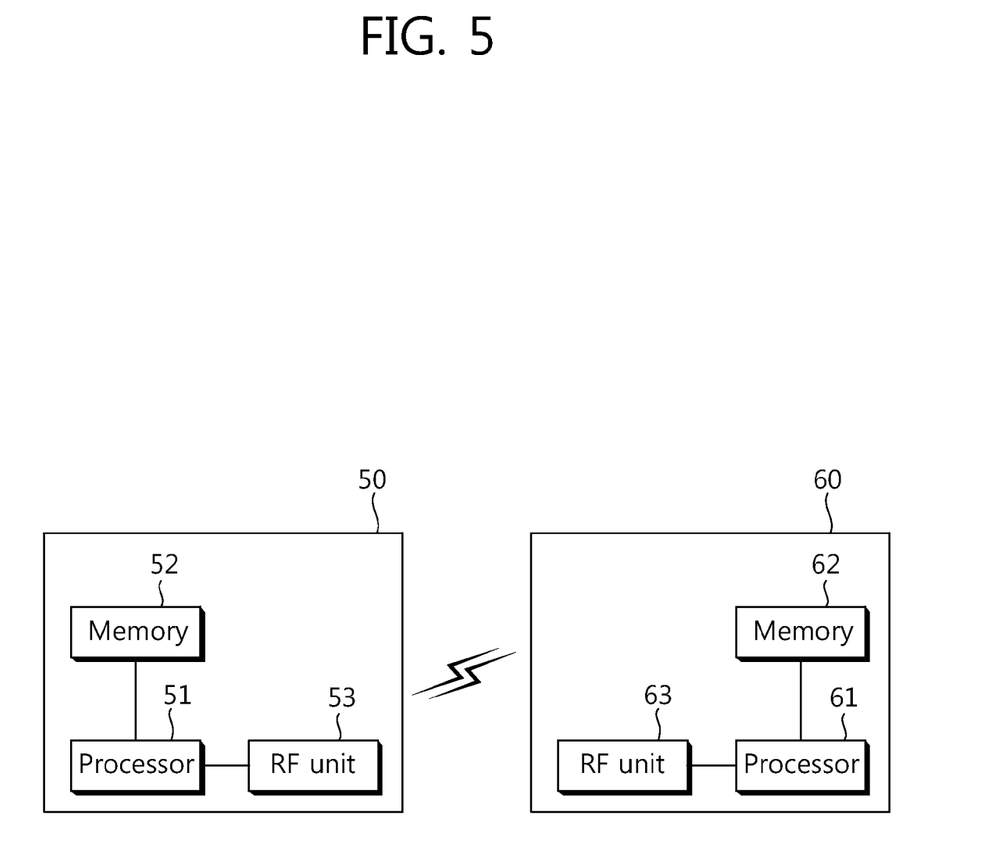
FIG. 5 is a block diagram illustrating wireless communication system in which an embodiment of the present invention is implemented.

FIG. 5 is a block diagram illustrating wireless communication system in which an embodiment of the present invention is implemented.

A BS 5 includes a processor 51, memory 52, and a Radio Frequency (RF) unit 53. The memory 52 is connected to the processor 51, and it stores instructions executed by the processor 51. The RF unit 53 is connected to the processor 51, and it sends and/or receives radio signals. The processor 51 may implement the functions, processes and/or methods of the BS in the embodiments of FIG. 4.

A wireless device 60 includes a processor 61, memory 62, and an RF unit 63. The memory 62 is connected to the processor 61, and it stores instructions executed by the processor 61. The RF unit 63 is connected to the processor 61, and it sends and/or receives radio signals. The processor 61 may implement the functions, processes and/or methods of the wireless device in the embodiments of FIG. 4.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the aforementioned embodiment is implemented in software, the aforementioned scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for reporting Channel State Information (CSI) in a wireless communication system, the method comprising:

receiving, by a wireless device, information about a CSI configuration from a base station;

determining, by the wireless device, a CSI reference resource based on the CSI configuration;

estimating, by the wireless device, CSI based on the CSI reference resource; and reporting, by the wireless device, the estimated CSI to the base station, wherein the CSI is estimated based on a transmission power of a reference signal (RS) for a time/frequency tracking and power offset information received from the base station, wherein the transmission power of the RS is represented by a ratio of the transmission power of the RS for the time/frequency tracking or a ratio of an energy per resource element (EPRE) of the RS for the time/frequency tracking, wherein the CSI configuration includes a CSI flag that indicates whether a Rank Indicator (RI) and a Precoding Matrix Indicator (PMI) are included in the CSI, wherein, if the CSI flag is set to 'on', the CSI includes the RI and PMI, which are to be reported, wherein, if the CSI flag is set to 'off', the CSI does not include the RI and PMI, and wherein, if the CSI flag is set to 'off', the CSI is further estimated based on a tracking reference signal (TRS) associated with single antenna port 0 or single antenna port 7.

2. The method of claim 1, wherein the CSI is estimated based on a Channel State Information-Reference Signal (CSI-RS).

3. The method of claim 2, wherein the CSI is estimated assuming that the CSI-RS is received through a single antenna port.

4. A wireless device for reporting Channel State Information (CSI) in a wireless communication system, the wireless device comprising:

a radio frequency (RF) unit configured to transmit and receive a radio signal; and a processor connected to the RF unit and configured to:

receive information about a CSI configuration from a base station;

determine a CSI reference resource based on the CSI configuration;

estimate CSI based on the CSI reference resource; and report the estimated CSI to the base station, wherein the CSI is estimated based on a transmission power of a reference signal (RS) for a time/frequency tracking and power offset information received from the base station, wherein the transmission power of the RS is represented by a ratio of the transmission power of the RS for the time/frequency tracking or a ratio of an energy per resource element (EPRE) of the RS for the time/frequency tracking, wherein the CSI configuration includes a CSI flag that indicates whether a Rank Indicator (RI) and a Precoding Matrix Indicator (PMI) are included in the CSI, wherein, if the CSI flag is set to 'on', the CSI includes the RI and PMI, which are to be reported, wherein, if the CSI flag is set to 'off', the CSI does not include the RI and PMI, and wherein, if the CSI flag is set to 'off', the CSI is further estimated based on a tracking reference signal (TRS) associated with single antenna port 0 or single antenna port 7.

* * * * *